United States Patent Office 3,177,079
Patented Apr. 6, 1965

3,177,079
PROCESS OF PREPARING SPUN PROTEIN FOOD
PRODUCTS BY USING SULFUR DIOXIDE
Simpey Kuramoto, St. Louis Park, Richard W. Westeen,
Minneapolis, and James L. Keen, St. Paul, Minn., assignors to General Mills, Inc., a corporation of Delaware
No Drawing. Filed Aug. 10, 1962, Ser. No. 216,033
12 Claims. (Cl. 99—17)

The present invention relates to new food products and the process of making same. More particularly, it relates to a process for improving the flavor of synthetic food products prepared from protein fibers and to such improved food products and fibers.

It is well known that artificial textile fibers can be prepared from vegetable and animal proteins such as soy protein, corn protein, peanut protein, casein and keratin. It is also known that such fibers can be used to prepare meat substitutes which possess the required amount of protein and which simulate meat as to texture, flavor and appearance. As disclosed in Boyer Patent 2,682,466, a meat substitute can be produced from edible protein material by forming protein fibers and then by suitable means, binding said fibers. These protein fibers are prepared by the creation of a spinning dope of protein which is then forced through a porous membrane such as a spinneret to form fibers or filaments which are coagulated in an acid-salt bath and oriented by suitable means, such as a series of rolls revolving at increasing speeds. The filaments are then placed in a salt solution (such as sodium chloride) of sufficient concentration to prevent the filaments from redissolving. Groups of these filaments, in accordance with the method disclosed in said Boyer patent, are freed from excess liquid by squeezing or centrifuging and mixed with a suitable binder. The individual groups of filaments may then be assembled into a tow and passed through a bath of melted fat or the like, or alternatively the individual groups of filaments may be first treated with fat and thereafter assembled into a tow. Different characteristics may be imparted to the final product by varying the steps leading up to the end product. For example, varying the pressure in assembling the final tow will vary the density and texture of the final product. Likewise, varying the method of coating the protein filaments will produce different effects. The toughness or tenderness of the resulting product can also be controlled to a degree by the amount of stretch which is imparted to the filaments in the initial forming procedure. This stretching results in an orientation of the molecules in the protein fibers and will generally be in the range of about 50 to 400%. The fiber bundles can be so arranged as to simulate the meat of mammals, fish, fowl, shell fish and crustaceans.

While products prepared according to the above-described process do simulate meats, the flavor thereof is not always completely satisfactory. Thus, the simulated food products may have an off-flavor due to the proteins used to prepare the fibers and other unexplained factors. It would be very desirable to prepare a synthetic food product having substantially the same flavor as natural food products.

Therefore, it is an object of the present invention to provide an improved method for preparing synthetic fibers from edible proteins.

Another object of the invention is to provide an improved method for preparing synthetic food products from edible proteins.

It is also an object of the invention to provide novel synthetic fibers and food products which have improved flavor.

These and other objects will become apparent from the following detailed description.

We have now discovered that the flavor of synthetic protein fibers and simulated food products prepared therefrom can be greatly improved by treating the precipitated filaments or fibers with sulfur dioxide. Generally, the process of the present invention comprises: (1) forming a dispersion of edible protein material; (2) forming filaments from said dispersion by precipitation in a coagulating bath; and (3) treating the precipitated filaments with sulfur dioxide. The treated filaments may also be (4) neutralized to raise the pH thereof. Simulated food products may be prepared by (5) impregnating the filaments with additive materials such as binders, flavoring agents and the like. Also, the impregnated filaments can be (6) allowed to set-up by heating.

A simplified flow diagram of the above-described process is as follows:

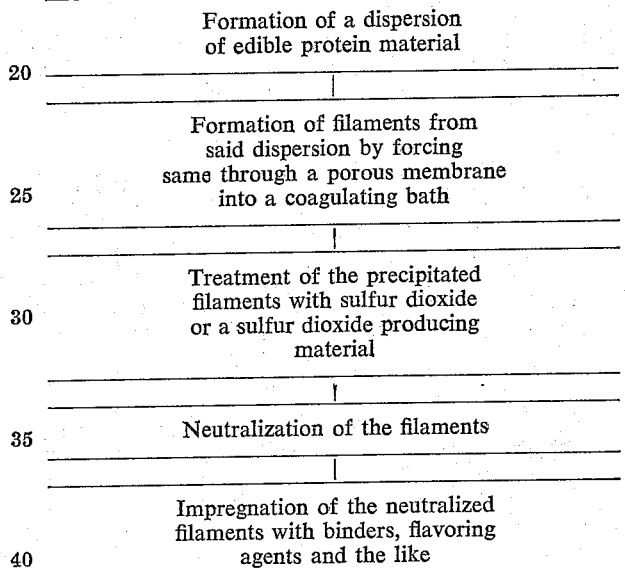

Formation of a dispersion
of edible protein material

|

Formation of filaments from
said dispersion by forcing
same through a porous membrane
into a coagulating bath

|

Treatment of the precipitated
filaments with sulfur dioxide
or a sulfur dioxide producing
material

|

Neutralization of the filaments

|

Impregnation of the neutralized
filaments with binders, flavoring
agents and the like The original protein dispersion and the filaments or fibers can be produced by any of the methods known in the art. Thus, a wide variety of protein materials which are edible can be used in preparing the dispersion. Representative of such materials are soybean, safflower, corn, peanut and pea proteins as well as various animal proteins such as casein. The edible protein is dispersed in an alkaline medium in varying amounts, such as from about 10–30% by weight. A suitable alkaline medium is water containing an alkali metal hydroxide, i.e., about 5 to 10% by weight NaOH. The pH of the spinning solution can vary within relatively wide limits, but will generally be in the range of about 9 to 13.5. The viscosity and temperature of such dispersions will generally be within the range of about 10,000–100,000 centipoises and about 20–45° C. respectively. Obviously, the viscosity, pH, temperature and concentrations of alkali metal hydroxide and protein will vary somewhat with the particular protein being dispersed. Also, the dispersion may amount to a colloidal solution, and it is understood that the use of either dispersion or colloidal solution in the claims is inclusive of the other.

After formation of the dispersion or spinning dope, it is forced through a porous membrane, such as a spinneret used in the production of rayon, into a coagulating bath which is generally an acid-salt solution. The streamlets coming through the spinneret are thus produced in the form of filaments. The filaments issuing from the spinneret, which is actually a small die having from perhaps 5,000 to 15,000 holes each on the order of 0.003–0.004 inch in diameter, will be of a diameter of about 0.003–

0.004 inch. Alternatively, coarser filaments can be produced by starting with the proteins in the form of powdered material and plasticizing them with about 25% alkaline water and then extruding the plasticized protein material through dies. Filaments produced by such a process may be of much greater thickness, on the order of paint brush bristles. It is also possible to have a series of spinnerets producing filaments from the protein dispersion. Such spinnerets may have the same or different number of holes making it possible to directly produce tows of filaments having the same or different diameters.

The coagulating bath is preferably an aqueous solution of salt and an acid. The salt (i.e., NaCl, for example) can be used in widely varying concentrations, such as from about 0.5 to 20% by weight. The acid can be any of those normally used in coagulating baths. Representative acidic compounds are acetic acid, lactic acid, citric acid, adipic acid, hydrochloric acid and the like. The concentration of said acids in the bath is not critical and may vary between about 0.5 to 10% by weight.

At this point, the filaments or fibers are conventionally stretched and/or neutralized with an alkaline material such as an alkali metal hydroxide, sodium bicarbonate or the like. However, we have found that the flavor of the fibers is materially improved if they are treated prior to neutralization with sulfur dioxide or a sulfur dioxide producing material.

Thus, sulfur dioxide can be added to the fibers in the acid-salt solution. This can be accomplished by bubbling sulfur dioxide through the fiber containing bath or by adding a sulfur dioxide producing material to the bath. Such materials include sulfurous acid, alkali metal hydrosulfites, such as sodium hydrosulfite ($Na_2S_2O_4 \cdot 2H_2O$), alkali metal bisulfites, such as sodium bisulfite ($NaHSO_3$) and the like. Any material which produces sulfur dioxide on addition to the fiber suspension can be used in the present process. The amount of sulfur dioxide added will vary considerably but should be sufficient to effect the desired improvement in flavor. Amounts of a few to about 10,000 p.p.m. based on the dry weight of the fibers are preferred. An especially preferred range is 300 to 1,000 p.p.m.

The filaments or bundles thereof (tows) are stretched by pulling them from the coagulating bath over a take-away reel. Preferably, stretching tensions of 50–400% are applied to the filaments or fibers. It is understood, however, that higher or lower tensions can be used and also that the stretching can be performed on a series of reels each with an increasing rate of speed or an increased stretching tension. It is further understood that the stretching of the fibers can take place in the coagulating bath, after emergence thereof from said bath, or partly in the bath and partly after emergence from the bath. Additionally, said stretching can be performed prior to or after treatment of the fibers with the sulfur dioxide or sulfur dioxide producing material. Also, the stretched or unstretched fibers can be taken from the coagulating bath and added to a bath containing salt and sulfur dioxide or a sulfur dioxide producing material.

The pH of the filaments or bundles thereof (tows), after treatment with the sulfur dioxide, is generally quite acidic which is undesirable since food products prepared therefrom would have a sour taste and would normally be too dry and tough. Thus, said filaments can be neutralized by passing them through a neutralizing bath which may be a salt solution containing an alkaline material such as an alkali metal hydroxide, sodium bicarbonate or the like. Alternatively, the filaments or bundles thereof can be neutralized by spraying them with a neutralizing solution while they are being stretched or being conveyed to the next step in the process. The neutralization is carried out until the pH of the fibers is in the range of about 5.0 to 6.4 which is the pH of most natural meats. However, the pH may generally be in the range of about 4.0 to about 7.0, if desired. The pH of the fibers can also be raised to the desired range by water washing. However, such procedure may require more handling time and somewhat more processing steps. As used herein, the terms "neutralizing" and "neutralization" include any method of raising the pH of the fibers to the desired degree.

The sulfur dioxide treated fibers, either before or after the described neutralization, can be stored or sold as such. However, the present invention also relates to the preparation of simulated food products, particularly meats, from the improved fibers. Thus after the neutralization step, the filaments are freed from excess neutralizing solution and impregnated with binders, flavoring agents and the like. The binder preferably consists of, or contains a substantial proportion of, a heat coagulable protein such as albumen. Various meat flavors which are available commercially can be added. Representative thereof are bouillon cubes having chicken, beef and other meat flavors. Synthetic ham, bacon, and sausage flavors may also be used. Additionally, various spices and salts can be employed to further flavor the fibers.

Vegetable oils and animal fats and oils can also be added to the fibers. Representative thereof are soybean oil, cottonseed oil, corn oil, coconut oil, palm kernel oil, olive oil, peanut oil, sesame seed oil, safflower oil, tallow, lard, chicken fat, butter, cod-liver oil and the like. The said oils and fats may be partially or fully hydrogenated.

The binder, flavoring agents, oils and fats can be added to the fibers separately. Thus, the fibers can first be passed through a bath containing the binder and, preferably also, the flavoring agents. The fibers can then be passed through a bath of the oil or melted fat. It is also understood that the individual fibers or bundles thereof of different sizes can be treated with the above-described agents to simulate meats of different textures. It is possible to treat said fibers in such a manner to produce meats having large areas of fat such as when bacon is simulated.

The binders, oils or fats and flavoring agents can also be applied to the fibers in a single operation. Thus, the various additives can be emulsified and the fibers passed through said emulsion to provide an even distribution of the binder, fat and flavoring agents in the simulated meat product. Any edible emulsifier can be used to prepare the additive emulsion. Representative of such emulsifiers are: mono- and diglycerides of fatty acids, such as monostearin, monopalmitin, monoolein, and dipalmitin; higher fatty acid esters of sugars, such as sucrose partial palmitate and sucrose partial oleate; phosphoric and sulfuric acid esters, such as dodecyl glyceryl ether sulfates and monostearin phosphate; partial esters of glycerol and both higher and lower fatty acids, such as glyceryl lactopalmitate; and polyoxyalkylene ethers of fatty esters of polyhydric alcohols, such as the polyoxyethylene ethers of sorbitan monostearate and sorbitan distearate.

Dyes and pigments or other coloring material may also be added to fibers. The dyes and the like are preferably added at the same time as the other additives.

The impregnated fibers are then set-up by heating, such as by baking, boiling, broiling and the like. One preferred method is to treat the fibers directly with steam. This can be accomplished in a variety of ways. Thus, the fiber tow can be pulled continuously through jets of live steam, or, more efficiently through a partially enclosed chamber having a steam inlet, such as a steam tower. The tower can be so positioned that the impregnated tow will pass downwardly through the tower directly from the bath. This is advantageous since the impregnated tow may have a tendency to adhere to the sides of the unlubricated steam chamber. Of course, other tower positions can be used. Thus, if enough tension is placed on the fiber tow, it can be passed horizontally through the tower to yield good results. The length of time which the impregnated fiber will be contacted with steam will vary considerably depending on the particular protein used to prepare the fiber, the thickness of the fiber tow, the particular addition agents and the amounts thereof. Good results are obtained with contact times of a few seconds to about one minute.

The simulated food product, after the described setting-up procedures, can be packaged and sold as such. However, it can be optionally treated in a variety of ways to provide specialized products. Thus, the treated tow can be cut into pieces or chunks of various sizes to simulate meat such as ham, chicken, tuna or other snack products. The product, either before or after said cutting, can be fried, smoked or dried. The dehydrated products can be readily rehydrated in boiling water. Such dehydrated products find use in gravies, soups, hot dishes and the like. The dehydration is preferably accomplished at temperatures of about 70–150° F.

The following specific examples are furnished for the purpose of illustration only and are not to be construed as placing any limitation on the scope of the present invention.

*Examples I and II*

A spinning solution comprising water, 18% by weight soy protein and 7% by weight NaOH and having a viscosity of about 20,000 cps. and a temperature of 40° C. was used to prepare fibers. The solution was forced through a rayon spinneret having 5,000 holes (diameters of 0.004 inch) into a coagulating bath composed of water containing 10% NaCl and 1.5% lactic acid. In Example I, the tow of precipitated fibers was taken out of the bath by means of a take-away reel adjusted so that stretch amounting to 100–200% was exerted on the fibers. The fibers were then water washed to remove excess acid and to raise the pH of the fibers to about 5.0. In Example II, sulfur dioxide was added to the fibers in the precipitation bath so that the fibers, containing about 65% by weight water, had an $SO_2$ content after treatment of about 1,000 p.p.m. The treated fibers were then processed as in Example I. Analysis of the fibers before the water washing showed that the peroxide No. of those of Example I was 2.4 and those of Example II was 0.0 (milliquivalents of $O_2/1000$ g. total sample—i.e., fibers containing about 65% water). The fibers of Example II, in addition to the greatly reduced peroxide No., were very bland while those of Example I had the characteristic and objectionable flavor of soybeans and a distinct paint flavor.

*Examples III and IV*

One hundred grams (aged for about 24 hours) of the fibers of Examples I and II (containing about 65% by weight water) were each impregnated with the following ingredients and amounts:

| | Amount |
|---|---|
| Egg albumen _____g__ | 20.0 |
| Flour _____g__ | 10.0 |
| Non-fat milk solids _____g__ | 10.0 |
| NaCl _____g__ | 8.0 |
| Yellow onion powder _____g__ | 1.0 |
| Mono-sodium glutamate _____g__ | 0.5 |
| Red dye (2% aqueous solution) _____ml__ | 1.5 |
| Water _____ml__ | 150.0 |

After impregnation, the fibers were placed in pans and baked for 30 min. at 350° F. The simulated meat product of Example IV (using the fibers of Example II) was judged to be far superior to that of Example III with no soy, beany or paint type flavors detected.

The above examples show that the treatment of the spun protein fibers according to our process produces fibers of improved flavor which improvement is carried over to simulated food products prepared therefrom. Although sulfur dioxide was used in Example II, equally good results are obtained using sulfurous acid, sodium hydrosulfite, sodium bisulfite, and other sulfur dioxide producing materials.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. A process of preparing a fibrous product comprising: (1) forming a dispersion of edible soy protein in an aqueous alkaline dispersing medium; (2) forming filaments from said dispersion by forcing same through a porous membrane into an acid coagulating bath; and (3) treating the precipitated filaments with an agent selected from the group consisting of sulfur dioxide and sulfur dioxide producing materials.

2. The process of claim 1 wherein the filaments are stretched to a degree sufficient to produce an orientation of the molecules thereof.

3. The process of claim 1 wherein the agent is sulfur dioxide.

4. The process of claim 1 wherein the sulfur dioxide producing material is sodium hydrosulfite.

5. The process of claim 1 wherein the agent is used in an amount sufficient to add from a few to about 10,000 p.p.m. of sulfur dioxide to the filaments based on the dry weight of the filaments.

6. The process of claim 5 wherein the filaments are (4) neutralized to a pH of about 4.0 to 7.0.

7. The process of claim 5 wherein the neutralized filaments are (5) impregnated with additive materials to form a fibrous food product.

8. The process of claim 6 wherein the additive materials are selected from the group consisting of binders, flavoring agents, colorants, oils, fats, emulsifiers and mixtures thereof.

9. The process of claim 7 wherein the binder comprises a substantial proportion of a heat coagulable protein.

10. The process of claim 8 wherein the heat coagulable protein is albumen.

11. The process of claim 6 wherein the fibrous food product is further treated by (6) allowing the impregnated filaments to set-up.

12. The process of claim 10 wherein the set-up filaments are (7) dehydrated.

References Cited by the Examiner

UNITED STATES PATENTS

| | | | |
|---|---|---|---|
| 1,973,281 | 9/34 | Bonotto _____ | 99—98 |
| 2,101,805 | 12/37 | Bonotto _____ | 99—98 |
| 2,489,208 | 11/49 | Turner _____ | 99—98 |
| 2,682,466 | 6/54 | Boyer _____ | 99—14 |
| 2,684,960 | 7/54 | Taylor _____ | 260—123.5 |
| 2,813,027 | 11/57 | Galliver et al. _____ | 99—14 XR |
| 2,830,902 | 4/58 | Anson et al. _____ | 99—14 |
| 2,930,700 | 3/60 | Bradof _____ | 99—98 |

A. LOUIS MONACELL, *Primary Examiner.*

BEATRICE H. STRIZAK, *Examiner.*